United States Patent
Kawasaki

(10) Patent No.: US 9,070,984 B2
(45) Date of Patent: Jun. 30, 2015

(54) MOBILE COMMUNICATION DEVICE AND COMMUNICATION CONTROL METHOD

(75) Inventor: Masayuki Kawasaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 273 days.

(21) Appl. No.: 12/994,461

(22) PCT Filed: May 29, 2009

(86) PCT No.: PCT/JP2009/059888
§ 371 (c)(1),
(2), (4) Date: Dec. 29, 2010

(87) PCT Pub. No.: WO2009/145312
PCT Pub. Date: Dec. 3, 2009

(65) Prior Publication Data
US 2012/0009881 A1    Jan. 12, 2012

(30) Foreign Application Priority Data
May 29, 2008 (JP) .................................. 2008-141436

(51) Int. Cl.
*H04B 7/00* (2006.01)
*H01Q 21/28* (2006.01)
(Continued)

(52) U.S. Cl.
CPC .............. *H01Q 21/28* (2013.01); *H01Q 1/242* (2013.01); *H04B 7/0689* (2013.01);
(Continued)

(58) Field of Classification Search
CPC .................................................... H04B 7/0874
USPC .......................... 455/272, 277.1, 277.2, 575.7
See application file for complete search history.

(56) References Cited

U.S. PATENT DOCUMENTS

| | | | |
|---|---|---|---|
| 5,930,245 A | * | 7/1999 | Ishizuka et al. ............... 370/337 |
| 6,018,555 A | * | 1/2000 | Mahany ........................ 375/347 |

(Continued)

FOREIGN PATENT DOCUMENTS

| | | |
|---|---|---|
| JP | 56158540 A | 12/1981 |
| JP | 5327586 A | 12/1993 |

(Continued)

OTHER PUBLICATIONS

Notice of Reasons for Rejection issued to JP Application No. 2008-141436, mailed Jun. 22, 2010.
(Continued)

*Primary Examiner* — Wen Huang
(74) *Attorney, Agent, or Firm* — Hoffmann & Baron, LLP

(57) ABSTRACT

Provided are a mobile communication device and a communication control method which can perform communication by using a stable high-quality antenna while suppressing a power consumption. The mobile communication device includes: a first antenna (31); a second antenna (32); a communication unit (33) which performs a continuous communication by using the first antenna (31) and intermittently receives a signal by using the second antenna (32); an analysis unit (34) which analyzes the communication quality of the second antenna (32) according to the information on the signal intermittently received via the second antenna (32) by the communication unit (33); and a control unit (35) which performs control so as to perform a continuous communication by using the second antenna (32) while intermittently receiving a signal by using the first antenna (31) if the communication quality of the second antenna (32) analyzed by the analysis unit (34) reaches a predetermined communication quality level.

4 Claims, 3 Drawing Sheets

(51) Int. Cl.
  *H01Q 1/24* (2006.01)
  *H04B 7/06* (2006.01)
  *H04B 7/08* (2006.01)
  *H04W 36/30* (2009.01)
  *H04W 88/06* (2009.01)

(52) U.S. Cl.
  CPC .......... *H04B 7/0691* (2013.01); *H04B 7/0814* (2013.01); *H04B 7/0871* (2013.01); *H04B 7/0874* (2013.01); *H04W 36/30* (2013.01); *H04W 88/06* (2013.01)

(56) References Cited

U.S. PATENT DOCUMENTS

| | | | | |
|---|---|---|---|---|
| 6,018,651 | A * | 1/2000 | Bruckert et al. | 455/277.1 |
| 6,023,615 | A * | 2/2000 | Bruckert et al. | 348/14.08 |
| 6,611,677 | B1 * | 8/2003 | Lindenmeier et al. | 455/135 |
| 7,043,218 | B1 * | 5/2006 | Ogino | 455/277.2 |
| 8,417,205 | B2 * | 4/2013 | Tang et al. | 455/272 |
| 2003/0190924 | A1 * | 10/2003 | Agashe et al. | 455/522 |
| 2004/0253955 | A1 * | 12/2004 | Love et al. | 455/442 |
| 2006/0258304 | A1 * | 11/2006 | Moon et al. | 455/101 |
| 2007/0232309 | A1 * | 10/2007 | Koszarsky | 455/436 |

FOREIGN PATENT DOCUMENTS

| | | |
|---|---|---|
| JP | 7162350 A | 6/1995 |
| JP | 7273705 A | 10/1995 |
| JP | 10242903 A | 9/1998 |
| JP | 2000-252896 A | 9/2000 |
| JP | 2000-357983 A | 12/2000 |
| JP | 2003-523126 T | 7/2003 |
| JP | 2007-116454 A | 5/2007 |
| JP | 2007-129630 A | 5/2007 |
| KR | 10-2006-0021882 A | 3/2006 |

OTHER PUBLICATIONS

Notice of Reasons for Rejection issued to JP Application No. 2008-141436, mailed Sep. 28, 2010.

Office Action issued to Korean Patent Application No. 10-2010-7029226, mailed Mar. 22, 2012.

* cited by examiner

MOBILE COMMUNICATION DEVICE AND COMMUNICATION CONTROL METHOD

CROSS-REFERENCE TO RELATED APPLICATIONS

The present application is the national stage of International Application No. PCT/JP2009/059888, filed May 29, 2009, which claims priority to Japanese Application No. 2008-141436, filed May 29, 2008, the entire contents of which are incorporated by reference herein.

TECHNICAL FIELD

The present invention relates to a mobile communication device having a plurality of antennas, and to a communication control method.

BACKGROUND ART

Mobile communication devices of recent years include some models that employ a diversity scheme in order to secure constant communication quality when moving. Here, the diversity scheme includes two schemes: a switching scheme and a composite scheme. The switching scheme is a scheme for maintaining reception quality by selecting a receiver having higher communication quality between two branches (two antennas, and in some cases, two receivers). Moreover, the composite scheme is a scheme for enhancing reception quality by synthesizing inputs of two branches.

Here, in the composite scheme, although reception quality is higher than that of the switching scheme, there is a drawback that the power consumption is increased. In order to solve this drawback, various kinds of techniques have been proposed (for example, see Patent Document 1).

Patent Document 1 discloses a technique, in which only a first branch (antenna) is firstly turned on to perform communication (switching scheme), and then, based on communication quality of a receiver during communication, a second branch (antenna) is turned on to perform communication by using both antennas (composite scheme). In addition, in the technique disclosed in Patent Document 1, while both antennas are being used to perform communication, based on communication quality of the second antenna, communication is performed by turning off the first antenna (switching scheme). In this way, a technique has been proposed, in which both the composite scheme and the switching scheme are used depending on the reception situation, thereby improving the power consumption.

Patent Document 1: Japanese Unexamined Patent Application Publication No. 2007-129630

DISCLOSURE OF THE INVENTION

Problems to be Solved by the Invention

Here, in a case in which Patent Document 1 is employed, while communication is being performed by using the second antenna, even if communication quality of the first antenna is actually higher than communication quality of the second antenna, switching control of the antennas is only performed based upon the communication quality of the second antenna. Therefore, there is a possibility that communication by using an antenna having higher communication quality cannot be performed, and optimal communication quality cannot be preferably maintained.

An object of the present invention is to provide a mobile communication device and a communication control method, with which high communication quality can be maintained.

Means for Solving the Problems

In order to solve the aforementioned problem, a mobile communication device according to a first aspect of the present invention is characterized by including: a first antenna; a second antenna; a communication unit, which continuously transmits or receives a signal by using the first antenna, and which intermittently receives a signal by using the second antenna; an analyzing unit that analyzes communication quality of the second antenna, based on information on a signal that is intermittently received by way of the communication unit by using the second antenna; and a control unit that performs control such that, in a case in which the communication quality of the second antenna analyzed by the analyzing unit is at a communication quality level that is higher than a predetermined communication quality level, a signal is continuously transmitted or received by using the second antenna, and a signal is intermittently received by using the first antenna.

According to a second aspect of the present invention, in the mobile communication device as recited in the first aspect, it is preferable that the analyzing unit analyzes communication quality of the first antenna, based on information on a signal that is continuously received by way of the communication unit by using the first antenna, and the control unit performs control such that, in a case in which the communication quality of the second antenna analyzed by the analyzing unit is at a communication quality level that is higher than the communication quality of the first antenna analyzed by the analyzing unit, a signal is continuously transmitted or received by using the second antenna, and a signal is intermittently received by using the first antenna.

In order to solve the aforementioned problem, a mobile communication device according to a third aspect of the present invention is characterized by including: a first antenna; a second antenna; a communication unit, which continuously transmits or receives a signal by using the first antenna, and which intermittently receives a signal by using the second antenna; an analyzing unit that analyzes communication quality of the first antenna, based on information on a signal that is continuously received by way of the communication unit by using the first antenna; and a control unit that performs control such that, in a case in which the communication quality of the first antenna analyzed by the analyzing unit is at a communication quality level that is higher than a predetermined communication quality level, a signal is received by lengthening a cycle in which a signal is intermittently received by using the second antenna.

In order to solve the aforementioned problem, a mobile communication device according to a fourth aspect of the present invention is characterized by including: a first antenna; a second antenna; a communication unit, which continuously transmits or receives a signal by using the first antenna, and which intermittently receives a signal by using the second antenna; an analyzing unit that analyzes communication quality of the first antenna, based on information on a signal that is continuously received by way of the communication unit by using the first antenna, and analyzes communication quality of the second antenna, based on information on a signal that is intermittently received by way of the communication unit by using the second antenna; and a control unit that performs control such that, in a case in which the communication quality of the first antenna and the communication quality of the second antenna analyzed by the analyzing unit are at communication quality levels that are lower than a predetermined communication quality level, a signal is continuously transmitted or received by using the first antenna and the second antenna.

In order to solve the aforementioned problem, a communication control method according to a fifth aspect of the present invention is characterized by including the steps of: analyzing, when a signal is continuously transmitted or received by using a first antenna, and a signal is intermittently received by using a second antenna, communication quality of the second antenna, based on information on a signal that is intermittently received by using the second antenna; and performing control such that, in a case in which the communication quality of the second antenna analyzed in the analyzing step is at a communication quality level that is higher than a predetermined communication quality level, a signal is continuously transmitted or received by using the second antenna, and a signal is intermittently received by using the first antenna.

Effects of the Invention

According to the present invention, a mobile communication device and a communication control method can be provided, with which high communication quality can be maintained.

Figure 1:
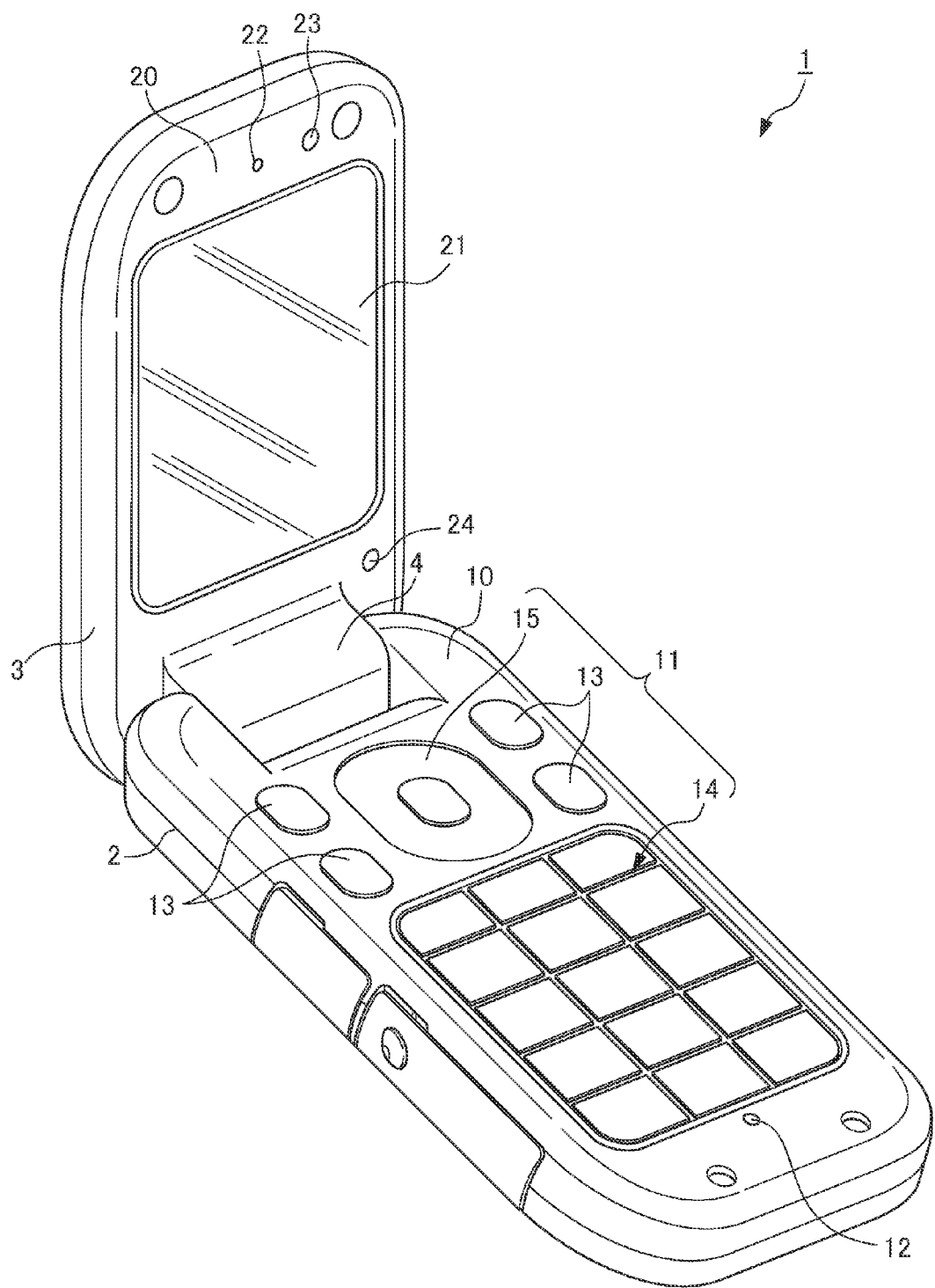
FIG. 1 is a view showing an appearance of a cellular telephone device according to the present invention.

EXPLANATION OF REFERENCE NUMERALS 1 cellular telephone device
31 first antenna
32 second antenna
33 communication unit
34 analyzing unit
35 control unit

PREFERRED MODE FOR CARRYING OUT THE INVENTION

A description is provided hereinafter regarding embodiments of the present invention. FIG. 1 is a perspective view showing an appearance of a cellular telephone device 1 as an example of a mobile communication device according to the present invention. It should be noted that, although a cellular telephone device is hereinafter described, the present invention is not limited thereto as long as a plurality of antennas are provided, and the portable electronic device may be a PHS (Personal Handyphone System; registered trademark), a PDA (Personal Digital Assistant), a portable navigation device, a notebook PC, etc.

The cellular telephone device 1 includes an operation unit side body 2 and a display unit side body 3. The operation unit side body 2 includes, on a front face portion 10 thereof, an operation key set 11 and a microphone 12 to which sound produced by a user of the cellular telephone device 1 during a phone call is input. The operation key set 11 includes: feature setting operation buttons 13 for operating various settings and various features such as a telephone number directory feature and a mail feature; input operation buttons 14 for inputting digits of a telephone number and characters for mail; and a selection operation button 15 that performs selection of the various operations and scrolling.

Moreover, the display unit side body 3 includes, on a front face portion 20 thereof, a display 21 that displays a variety of information, a sound output unit 22 that outputs sound of the other party of a phone call, an imaging unit 23 configured with a CCD (Charge Coupled Device) camera or the like that captures an image of a subject, and a speaker 24 that outputs music, etc. to the outside.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

It should be noted that, although FIG. 1 shows a so-called folder-type cellular telephone device, the present invention is not limited thereto. The cellular telephone device 1 may be of: a slider type in which one body slides to one direction from a state in which the operation unit side body 2 and the display unit side body 3 are mutually superimposed; a rotating type (turning type) in which one body is rotated around an axis line along the direction of superimposing the operation unit side body 2 and the display unit side body 3; or a straight type in which the operation unit side body 2 and the display unit side body 3 are disposed in a single body without a connecting portion.

The cellular telephone device 1 according to the present invention has a function in which, while communication is being performed via a first antenna, communication quality of a second antenna is intermittently monitored, and in a case in which the communication quality of the second antenna is higher than that of the first antenna, the communication is switched from the first antenna to the second antenna.

First Embodiment

Figure 2:
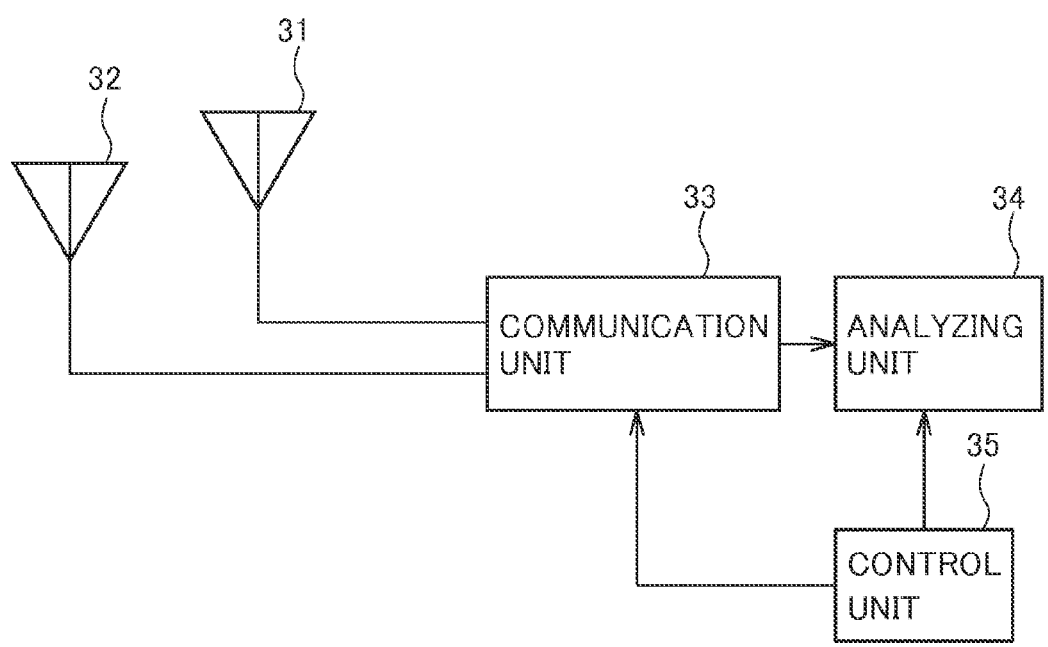
FIG. 2 is a block diagram showing features of the cellular telephone device according to the present invention.

Here, a configuration for achieving the function is described with reference to a functional block diagram shown in FIG. 2. As shown in FIG. 2, the cellular telephone device 1 includes a first antenna 31, a second antenna 32, a communication unit 33, an analyzing unit 34, and a control unit 35. It should be noted that the cellular telephone device 1 employs a reception method in accordance with the diversity scheme by using the first antenna 31 and the second antenna 32.

The communication unit 33 continuously transmits or receives a signal by using the first antenna 31, and intermittently receives a signal by using the second antenna (for example, once in several seconds, or at an interval of about several hundred milliseconds).

The analyzing unit 34 analyzes communication quality of the second antenna 32, based on information A on a signal that is intermittently received by way of the communication unit 33 by using the second antenna 32. It should be noted that the information A is information on communication quality such as, for example, reception intensity attributed to C (carrier) or the like, reception efficiency attributed to a C/N (carrier-to-noise ratio) value, and electric field intensity that it is not limited to reception intensity attributed to AGC (automatic gain control).

In a case in which the communication quality of the second antenna 32 analyzed by the analyzing unit 34 is at a communication quality level that is higher than a predetermined communication quality level (in a case in which C, C/N, AGC, etc. are higher than a predetermined value), the control unit 35 controls the communication unit 33 such that a signal is continuously transmitted or received by using the second antenna 32, and a signal is intermittently received by using the first antenna 31.

With such a configuration, according to the present invention, while communication is being performed by way of the first antenna 31, it is possible to determine which of the first antenna 31 and the second antenna 32 should be used for communication (transmission or reception of a signal), based on the communication quality of the second antenna 32. Moreover, since signal reception via the second antenna 32 is intermittently performed, high communication quality is maintained while suppressing the power consumption.

Second Embodiment

As shown in FIG. 2, the cellular telephone device 1 includes a first antenna 31, a second antenna 32, a communication unit 33, an analyzing unit 34, and a control unit 35. It should be noted that the cellular telephone device 1 employs a reception method in accordance with the diversity scheme by using the first antenna 31 and the second antenna 32.

The communication unit 33 continuously transmits or receives a signal by using the first antenna 31, and intermittently receives a signal by using the second antenna (for example, once in several seconds, or at an interval of about several hundred milliseconds).

The analyzing unit 34 analyzes communication quality of the first antenna 31, based on information B on a signal that is continuously received by way of the communication unit 33 by using the first antenna 31. It should be noted that the information B is information on communication quality such as, for example, reception intensity attributed to C (carrier) or the like, reception efficiency attributed to a C/N (carrier-to-noise ratio) value, and electric field intensity that it is not limited to reception intensity attributed to AGC (automatic gain control).

In a case in which the communication quality of the second antenna 32 analyzed by the analyzing unit 34 is at a communication quality level that is higher than the communication quality level of the first antenna 31 analyzed by the analyzing unit 34 (in a case in which C, C/N, AGC, etc. of the second antenna 32 are higher than C, C/N, AGC, etc. of the first antenna 31), the control unit 35 controls the communication unit 33 such that a signal is continuously transmitted or received by using the second antenna 32, and a signal is intermittently received by using the first antenna 31.

With such a configuration, according to the present invention, it is possible to accurately determine which of the first antenna 31 and the second antenna 32 should be used for communication (transmission or reception of a signal), based on comparison of the communication quality of the first antenna 31 and the second antenna 32. Therefore, high communication quality can be preferably maintained.

Third Embodiment

As shown in FIG. 2, the cellular telephone device 1 includes a first antenna 31, a second antenna 32, a communication unit 33, an analyzing unit 34, and a control unit 35. It should be noted that the cellular telephone device 1 employs a reception method in accordance with the diversity scheme by using the first antenna 31 and the second antenna 32.

The communication unit 33 continuously transmits or receives a signal by using the first antenna 31, and intermittently receives a signal by using the second antenna (for example, once in several seconds, or at an interval of about several hundred milliseconds).

The analyzing unit 34 analyzes communication quality of the first antenna 31, based on information A on a signal that is continuously received by way of the communication unit 33 by using the first antenna 31. It should be noted that the information A is information on communication quality such as, for example, reception intensity attributed to C (carrier) or the like, reception efficiency attributed to a C/N (carrier-to-noise ratio) value, and electric field intensity that it is not limited to reception intensity attributed to AGC (automatic gain control).

In a case in which the communication quality of the first antenna 31 analyzed by the analyzing unit 34 is at a communication quality level that is higher than a predetermined communication quality level (in a case in which C, C/N, AGC, etc. are higher than a predetermined value), the control unit 35 controls the communication unit 33 such that a signal is received by lengthening a cycle in which a signal is intermittently received by using the second antenna 32.

With such a configuration, according to the present invention, in a case in which the communication quality of the first antenna 31 is high, the intermittent reception cycle of the second antenna 32 is lengthened; therefore, the power consumption can be preferably reduced. Moreover, according to the present invention, while communication is being performed by way of the first antenna 31, it is possible to determine which of the first antenna 31 and the second antenna 32 should be used for communication (transmission or reception of a signal), based on the communication quality of the second antenna 32. In addition, since signal reception via the second antenna 32 is intermittently performed, high communication quality is maintained while suppressing the power consumption.

Fourth Embodiment

As shown in FIG. 2, the cellular telephone device 1 includes a first antenna 31, a second antenna 32, a communication unit 33, an analyzing unit 34, and a control unit 35. It should be noted that the cellular telephone device 1 employs a reception method in accordance with the diversity scheme by using the first antenna 31 and the second antenna 32.

The communication unit 33 continuously transmits or receives a signal by using the first antenna 31, and intermittently receives a signal by using the second antenna (for example, once in several seconds, or at an interval of about several hundred milliseconds).

The analyzing unit 34 analyzes communication quality of the first antenna 31, based on information B on a signal that is continuously received by way of the communication unit 33 by using the first antenna 31. Moreover, the analyzing unit 34 analyzes communication quality of the second antenna 32, based on information A on a signal that is intermittently received by way of the communication unit 33 by using the second antenna 32. It should be noted that the information A and B is information on communication quality such as, for example, reception intensity attributed to C (carrier) or the like, reception efficiency attributed to a C/N (carrier-to-noise ratio) value, and electric field intensity that it is not limited to reception intensity attributed to AGC (automatic gain control).

In a case in which the communication quality of the first antenna 31 and the communication quality of the second antenna 32 analyzed by the analyzing unit 34 are at communication quality levels that are lower than a predetermined communication quality level, respectively (in a case in which C, C/N, AGC, etc. are lower than a predetermined value), the control unit 35 controls the communication unit 33 such that a signal is continuously transmitted or received by using the first antenna 31 and the second antenna 32.

With such a configuration, according to the present invention, in a case in which both of the communication quality of the first antenna 31 and the communication quality of the second antenna 32 are lower than a predetermined communication quality level, a so-called composite scheme is employed in which both of the first antenna 31 and the second antenna 32 are used to transmit or receive a signal. Therefore, high communication quality can be preferably maintained.

Here, based on the first to fourth embodiments, timing for switching the first antenna 31 and the second antenna 32 is specifically described with reference to FIG. 3.

Figure 3:
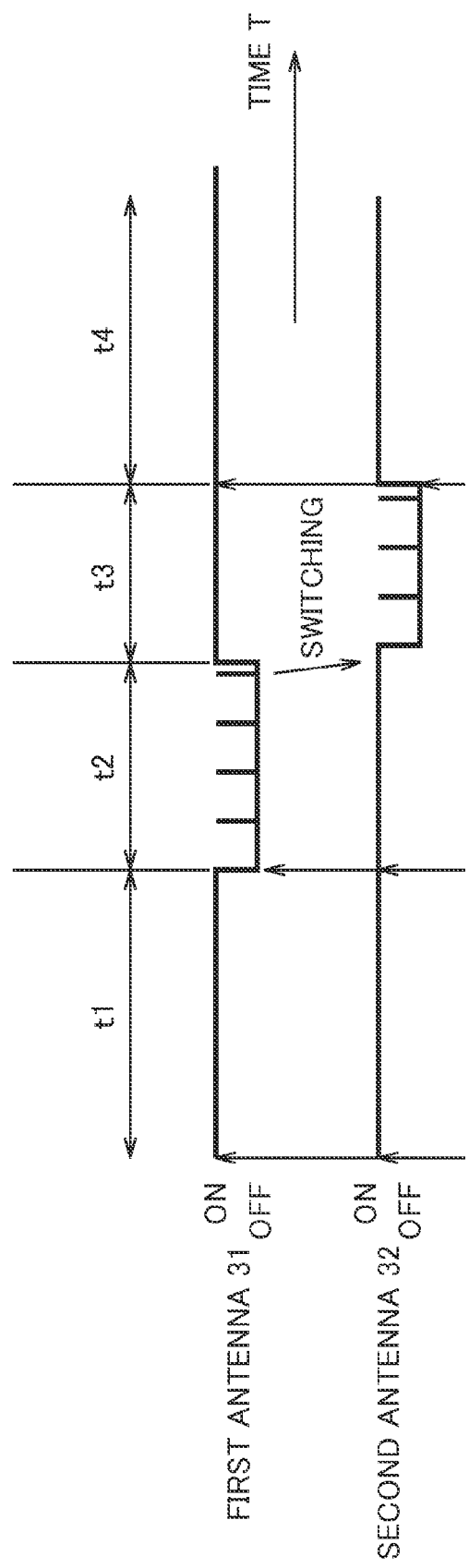
FIG. 3 is a diagram illustrating timing for switching antennas according to the present invention.

As shown in FIG. 3, during time t1, both of the first antenna 31 and the second antenna 32 are not at a certain communication quality level (weak electric field); therefore, the control unit 35 employs a scheme (composite scheme) in which both of the first antenna 31 and the second antenna 32 are turned into an ON state to be used (corresponding to the fourth embodiment).

As shown in FIG. 3, during time t2, the communication quality level of the second antenna 32 is higher than that of the first antenna 31 (middle electric field); therefore, the control unit 35 employs a scheme (switching scheme) in which the first antenna 31 is turned into an OFF state, and the second antenna 32 is turned into an ON state to be used. Moreover, the control unit 35 controls the communication unit 33 such that a signal is intermittently received by using the first antenna 31, and the communication quality level of the first antenna 31 is monitored (corresponding to the first and second embodiments).

In addition, as shown in FIG. 3, during time t3, the communication quality level of the first antenna 31 is higher than that of the second antenna 32 (middle electric field); therefore, the control unit 35 employs a scheme (switching scheme) in which the first antenna 31 is turned into an ON state to be used, and the second antenna 32 is turned into an OFF state. Furthermore, the control unit 35 controls the communication unit 33 such that a signal is intermittently received by using the second antenna 32, and the communication quality level of the second antenna 32 is monitored (corresponding to the first and second embodiments).

As shown in FIG. 3, during time t4, again, both of the first antenna 31 and the second antenna 32 are not at a certain communication quality level (weak electric field); therefore, the control unit 35 employs a scheme (composite scheme) in which both of the first antenna 31 and the second antenna 32 are turned into an ON state to be used (corresponding to the fourth embodiment).

In this way, according to the present invention, communication can be always performed by using the antenna(s) having stable and high communication quality, while suppressing the power consumption. Moreover, according to the present invention, even if a threshold value of the communication quality level when switching the first antenna 31 and the second antenna 32 is set to a very edge of the weak electric field, the communication quality can be stabilized. Therefore, the power consumption can be reduced.

In addition, in the description of the first to third embodiments, control is performed such that, while communication is being performed by way of the first antenna, the communication quality of the second antenna is confirmed, and if the communication quality of the second antenna is higher, the communication is switched from the first antenna to the second antenna; however, if the antennas are frequently switched, the power consumption is increased; therefore, a certain hysteresis may be provided. More specifically, the antennas are switched on a condition that a communication quality level being higher than a constant level is continuously secured for a predetermined period of time.

The invention claimed is:

1. A mobile communication device, comprising:
   a first antenna;
   a second antenna;
   a communication unit, which performs a communication that includes transmitting or receiving a signal by using at least one of the first antenna or the second antenna, and which intermittently receives a signal based on an intermittent reception cycle that is variable by using one of the first antenna or the second antenna;
   an analyzing unit that analyzes a communication quality of the first antenna based on information on a signal that is continuously received by way of the communication unit by using the first antenna; and
   a control unit that controls the communication cycle during communications performed by the first antenna by lengthening the intermittent reception cycle of the second antenna for receiving a signal intermittently, in a case in which a measured communication quality of the first antenna as analyzed by the analyzing unit is higher than a predetermined communication quality level, the first antenna being used to continuously transmit or receive the signal during which time the second antenna maintains an intermittent cycle, wherein the first antenna is simultaneously receiving or transmitting a communication continuously, thereby maintaining a communication quality while suppressing power consumption.

2. The mobile communication device of claim 1, further comprising a control unit that controls the communication cycle during communications performed by the second antenna by lengthening the intermittent reception cycle of the first antenna for receiving a signal intermittently, in a case in which the measured communication quality of the second antenna analyzed by the analyzing unit is at a communication quality level that is higher than a predetermined communication quality level, the second antenna being used to continuously transmit or receive the signal, thereby maintaining a communication quality while suppressing power consumption.

3. A mobile communication method, comprising:
   a step of analyzing a communication quality of a first antenna when a communication includes transmitting or receiving a signal by using at least one of the first antenna or a second antenna and a signal is intermittently received based on an intermittent reception cycle by using one of the first antenna or the second antenna, a measured communication quality of the first antenna being based on information on a signal that is continuously received by using the first antenna or the second antenna; and
   a step of lengthening a cycle for receiving a signal intermittently using the first or second antenna by lengthening the intermittent reception cycle of the second antenna in a case in which the communication quality of the first antenna as analyzed, is at a measured communication quality level that is higher than a predetermined communication quality level, the first antenna being used for continuously transmitting or receiving a signal, during which time the second antenna maintains an intermittent cycle, wherein the first antenna is simultaneously receiving or transmitting a communication continuously, thereby maintaining a communication quality while suppressing power consumption.

4. The mobile communication method of claim 3, further comprising a step of lengthening a cycle for receiving a signal intermittently using the first antenna by lengthening the intermittent reception cycle of the first antenna, in a case in which the communication quality of the second antenna as analyzed, is at a measured communication quality level that is higher than a predetermined communication quality level, the second antenna being used for continuously transmitting or receiving a signal, thereby maintaining a communication quality while suppressing power consumption.

\* \* \* \* \*